Nov. 3, 1970     JUN KIMURA ET AL     3,537,760
TRACK FOR CRAWLER TRACTORS
Filed May 17, 1968     4 Sheets-Sheet 1

INVENTORS
JUN KIMURA
TOSHIMICHI IKEDA

BY Craig & Antonelli

ATTORNEYS

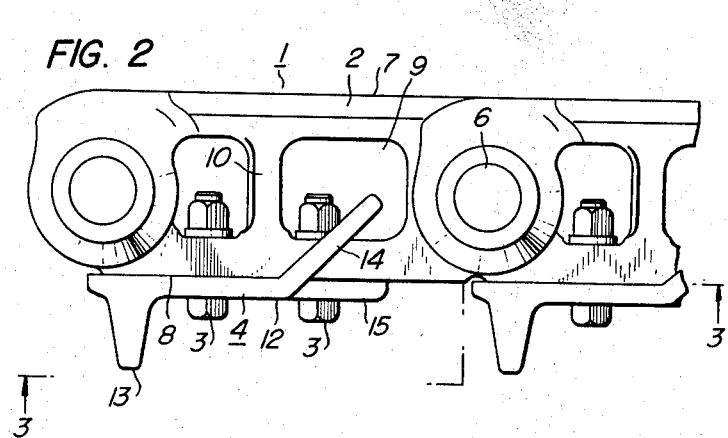
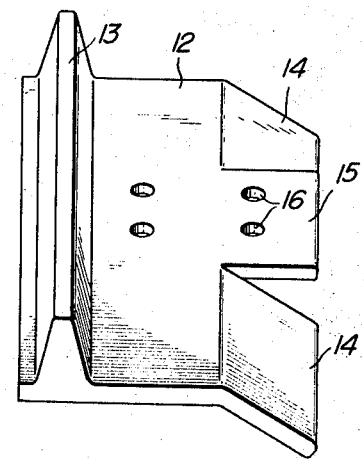
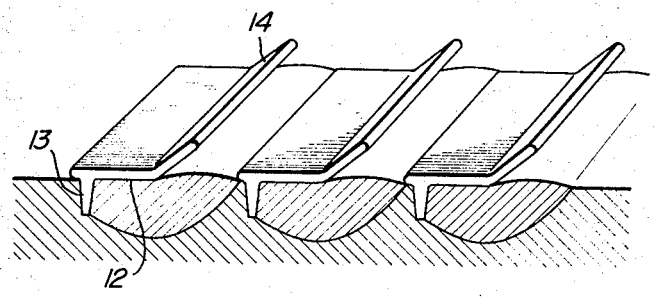

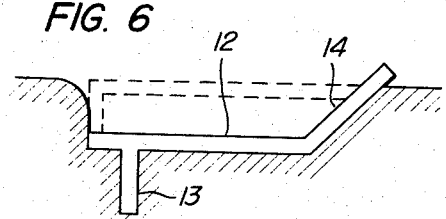
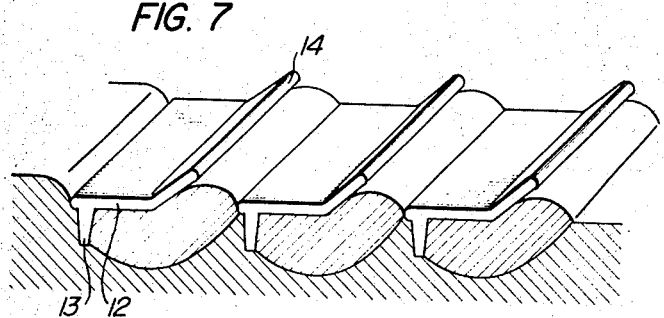
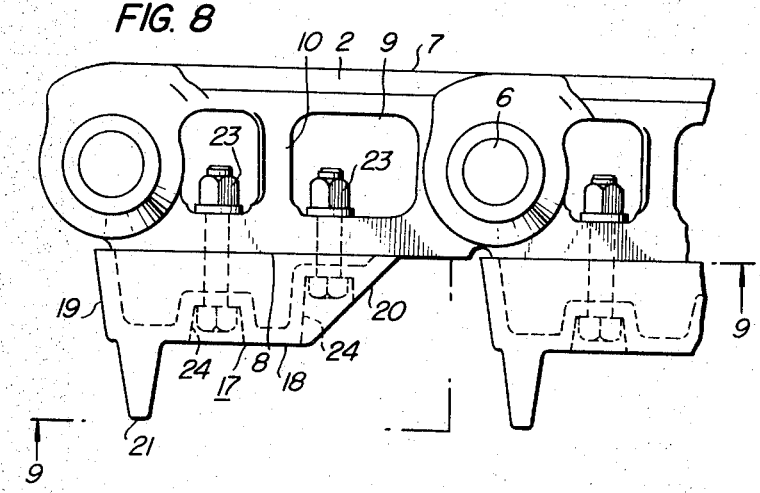

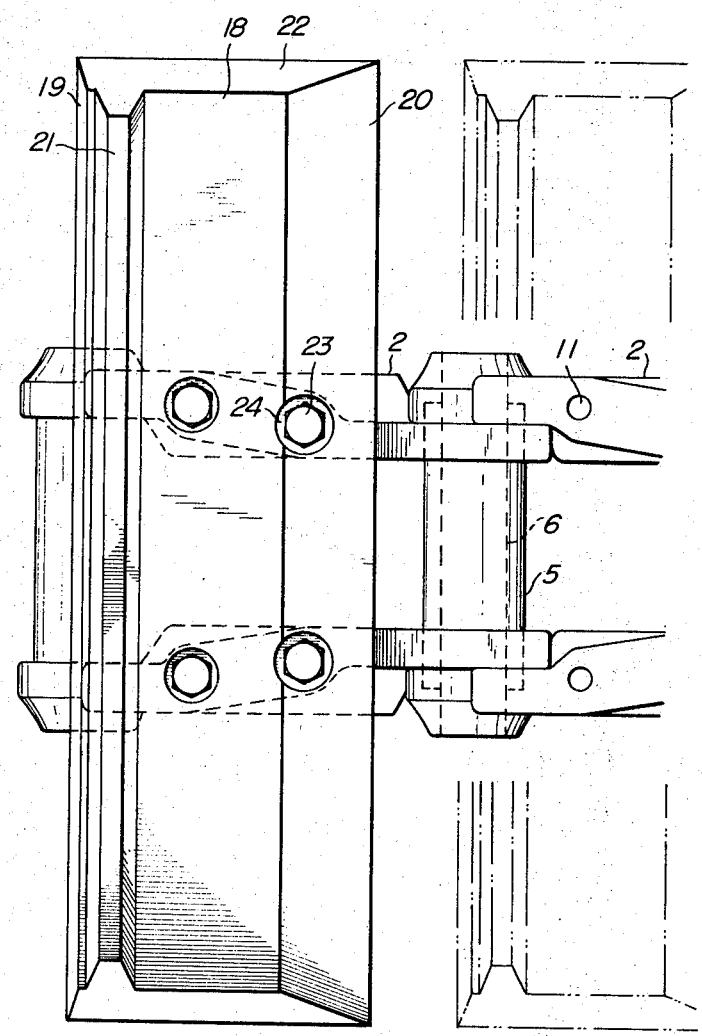

3,537,760
TRACK FOR CRAWLER TRACTORS
Jun Kimura, Matsudo-shi, and Toshimichi Ikeda, Tokyo, Japan, assignors to Hitachi, Ltd., Tokyo, Japan, a corporation of Japan
Filed May 17, 1968, Ser. No. 730,160
Int. Cl. B62d 55/26
U.S. Cl. 305—54                                             5 Claims

ABSTRACT OF THE DISCLOSURE

A track for crawler tractors including track shoes each having an inclined plate portion extending from the trailing end of a flat plate portion of a conventional track shoe having a grouser projecting from the leading end of the flat plate portion. By the use of such track shoes, soil broken by the grouser is received and caught by the inclined plate portions and reduces the sinkage of the track and generates effective reaction against the tractional force of the track when it is in the operation on a soft and weak ground.

BACKGROUND OF THE INVENTION

Field of the invention

The present invention relates to a track of crawler tractors, which has improved characteristics of traction and sinkage and renders an improved maneuverability even in the operation on a soft and weak ground.

Description of the prior art

Maneuverability of crawler tractors on a soft and weak ground is an important object in the field of off-the-road locomotion. Construction machines especially are often operated on a relatively soft and weak ground, and in such cases, the tracks of the machines bog down into the ground and are unable to fulfill their duties satisfactorily. Therefore, crawler tractors which are to be operated on a soft and weak ground must show a small sinkage of the tracks into the ground even on the soft and weak ground.

Conventionally, several long and wide tracks have been developed based upon a concept that if the contact pressure of the track onto the ground is lowered, the sinkage of the track into the ground will be reduced. However, there is practically a limit in increasing the length and the width of a track, and there is also a problem that if an extremely long and wide track is used, the running resistance becomes unfavorably high and it becomes impossible to steer the tractor.

It is also suggested as a method of improving the tractional ability of a crawler tractor to use spaced link tracks. The spaced link track has conventional track shoes, which, however, are so arranged that each shoe is spaced from the adjacent shoes as shown in FIG. 1 of the accompanying drawing. By such arrangement, the broken section of soil formed by grousers of the track shoes is effectively utilized for increasing the tractional force.

The spaced link tracks show an improved tractional ability on a relatively hard ground and on a soft ground which is supported by a hard underlayer. However, it is unavoidable even for the spaced link tracks to sink into the ground due to the weight of the vehicle when it is operated on such a soft ground as a wet land or a peat bog, wherein the mud broken by the grousers of the track shoes swells up over the track shoes and no strong tractional force can be obtained.

SUMMARY OF THE INVENTION

Accordingly, the object of the present invention is to decrease the sinkage and to increase the tractional force of the tracks of crawler tractors in the operation on a soft and weak ground so that the tractors can be operated at the same efficiency as that on a ground of normal nature.

According to the present invention, the above-mentioned object is attained by a track comprising an endless chain composed of pairs of linked track links and track shoes each mounted on each pair of said track links, characterized in that said track shoe has a flat plate portion, a grouser projecting from the leading end of said flat plate portion and an inclined plate portion extending from the trailing end of said flat plate portion toward said track link.

The track shoes of the present invention may preferably be so arranged that each of them is spaced from the adjacent ones so that the broken section of soil formed by the grouser is effectively utilized for increasing the tractional force.

Furthermore, the track shoe of the present invention may be formed as a box having integrally a flat plate portion, a right-angled plate portion extending substantially at right angle from the leading end of said flat plate portion, an inclined plate portion extending from the trailing end of said flat plate portion toward said track links, and a grouser projecting from the leading end of said flat plate portion, whereby a track shoe having a high strength and rigidity can be obtained in spite of its relatively low weight.

BRIEF DESCRIPTION OF THE DRAWINGS

FIG. 2 is a fragmentary elevational view of an embodiment of the track of the present invention;

FIG. 4 is a perspective view of a track shoe which is used for the track shown in FIG. 2;

FIG. 5 is a rough perspective view of the track shown in FIG. 2, showing a condition when it is in the operation on a hard ground;

FIGS. 6 and 7 are side and perspective views of the track shown in FIG. 2, respectively, showing another condition when it is in the operation on a soft and weak ground;

FIG. 8 is a fragmentary elevational view of another embodiment of the track of the present invention; and FIG. 9 is a plan view of the track shown in FIG. 8, taken by the line 9—9 of FIG. 8.

DESCRIPTION OF THE PREFERRED EMBODIMENTS

The present invention will now be explained in more detail with reference to the accompanying drawings showing some preferred embodiments of the track of the present invention.

Figure 1:
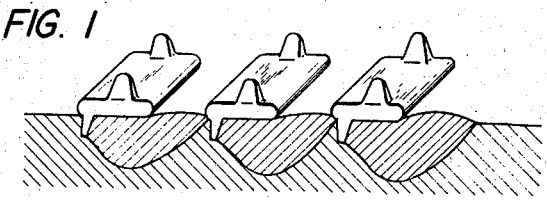
FIG. 1 is a rough perspective view of a conventional spaced link track.
Figure 3:
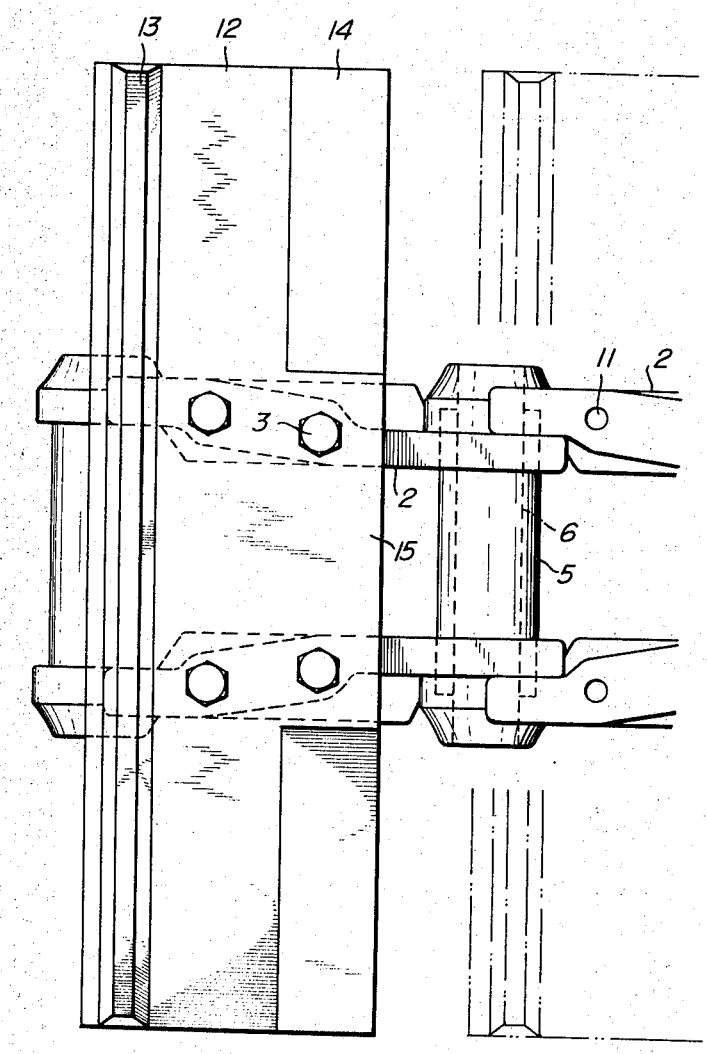
FIG. 3 is a plan view of the track shown in FIG. 2, taken by the line 3—3 of FIG. 2.

Referring to FIGS. 2 and 3, a track which is constructed according to the concept of the present invention and is generally shown by numeral 1 includes a chain composed of pairs of track links 2 and track shoes 4, each being mounted on each pair of said track links by fastening means 3. The chain is assembled in such a manner that each pair of said track links are connected by a bushing 5 which is passed through bores each provided at one end of an adjacent track link and is pressed into counterbores each provided at one end of the first-mentioned track link, and thereafter, a pin 6 is inserted into the bushing. Thus, a series of links is obtained, and at last both terminals are connected with each other by a master bushing and a master pin (both not shown) to form an endless chain. This endless chain is supported on a guide wheel and a drive sprocket wheel (both not shown). The pin 6 serves to join adjacent pairs of track links to form a chain, while the bushing 5 serves to keep a pair of track links in parallelism of a predetermined distance and also serves as a bearing. Furthermore, the bushing prevents the rocking of the pin 6.

The track link 2 has a beam portion 7 and an oppositely arranged track shoe supporting portion 8, both portions being connected by a pillar portion 10, whereby a link structure having a high strength and rigidity is obtained in spite of its reduced weight due to a vacant space 9. The track shoe supporting portion 8 is provided with suitable openings 11 to receive said fastening means for mounting the track shoe on the track link. The track link 2 has a length which is longer than that of the track shoe by about one third of the length of the latter.

The structure of the track shoe 4 will be explained with reference to FIG. 4. The track shoe which may be formed by casting or forging has a flat plate portion 12, a grouser 13 projecting from the leading end of the flat plate portion and an inclined plate portion 14 extending from the trailing end of the flat plate portion toward the track links. A central portion between two segments of the inclined plate portion 14 is formed flat as an extension 15 of the flat plate portion 12, which is so adapted as to have a width enough to cover a pair of spaced track links 2 and be fastened to the track links in order to make easy mounting of the track shoe to the track links. The extension 15 is, therefore, provided with openings 16 which are corresponding to the openings 11 of the track links 2.

The grouser 13 of the track shoe 4 causes deformation of soil in the same manner as the grouser of the conventional spaced link track and functions in the same way. Soil deformed by the grouser 13 swells up between track shoes, and the soil is pushed by the inclined plate portion 14, which causes a reaction force to increase the tractional force of the tractor. Accordingly, it is most preferable to incline the inclined plate portion 14 at 45° with respect to the flat plate portion 12.

The track shoe 4 is mounted to the track links 2 by arranging them so that the openings 16 of the track shoe 4 coincide with the openings 11 of the track shoe supporting portion 8 and clamping them by the fastening means 3 applied to said openings. In the embodiment shown in FIGS. 2 and 3, there is left between two adjacent track shoes a space extending over a length of about one third of the length of the track shoe 4 when the track shoes are mounted.

The track of the present invention operates as follows:

When the track is operated on a hard ground, the track does not sink into the ground. In this case soil broken by the grouser can support the track sufficiently via the flat plate portion and renders sufficient reaction against the tractional force of the track, as the conventional spaced link track does, since the track shoes are spaced enough to fully utilize the broken section of soil (FIG. 5).

When the track is operated on a soft and weak ground, the track sinks into the ground as shown in FIG. 6, whereby, however, the effective area for supporting the track shoe is increased as shown by broken lines in FIG. 6 because of the inclined plate portion 14, and accordingly, the sinkage of the track shoe is correspondingly reduced. At the same time, the effective clearance between the two adjacent track shoes is reduced as compared with the case when the track is operated on a hard ground, whereby the soil which was broken by the grouser and is swelling up toward the inside of the track in the opposite direction to the running direction of the track is caught and pushed by the inclined plate portion 14 of the track shoe and renders increased reaction against the tractional force of the track. In this manner, the track of the present invention can be operated on a soft and weak ground at a high efficiency which is substantially equal to that on a hard ground.

FIGS. 8 and 9 show another embodiment of the track of the present invention. Since the structure of the track links is same as that of the track shown in FIGS. 2 and 3, the description of the track links is omitted by applying the same reference numerals to the same portions.

The track shoe generally shown by 17 of this second embodiment, which may preferably be formed by casting, has a form of a box having integrally a flat plate portion 18, a right-angled plate portion 19 extending substantially at right angle from the leading end of the flat plate portion, an inclined plate portion 20 extending from the trailing end of the flat plate portion toward the track links, and a grouser 21 projecting from the leading end of the flat plate portion. In this case, the three surfaces of the flat plate portion 18, the right-angled plate portion 19 and the inclined plate portion 20 constitute a contact surface for soil and the inclined plate portion 20 serves in the same manner as the aforementioned inclined plate portion 14.

Side plate portions 22 of said box are formed in a steeply inclined relation to the flat plate portion. These side plate portions are effective to prevent sideward slipping of the track, and for that purpose it is most preferable that the side plate portion is turned from the flat plate portion by an angle of about 70 degrees. If the angle is smaller, the effect of preventing the sideward slipping is decreased.

The flat plate portion 18 and the inclined plate portion 20 are provided with concaves 24 for receiving fastening means 23 which mount the track shoe 17 to the track links 2. When the track shoes 17 are mounted to the track links, there is also left between two adjacent track shoes a space extending over a length of about one third of the length of the track shoe 17.

Because of the box-shaped structure of the track shoe 17, it has a high strength and rigidity in spite of its relatively low weight.

It will be readily understood that the track of the second embodiment can also be operated on a soft and weak ground at a high efficiency which is substantially equal to that on a hard ground, as the track of the first embodiment.

In the above, the descriptions are made for two specific tracks, which are preferred embodiments of the present invention. However, it is to be understood that a lot of modifications are applicable to the tracks herein described without departing from the spirit of the present invention. Especially, it is included within the scope of the present invention to eliminate the space between two adjacent track shoes of FIGS. 2 and 8 and to closely arrange them. In this case the length of the track link is correspondingly shortened.

We claim:

1. A track comprising an endless chain composed of pairs of linked track links and track shoes with each track shoe being mounted on and extending laterally a substantial distance beyond the sides of each pair of said track links, characterized in that each track shoe has an uncovered ground stepping portion consisting of a first portion which is substantially flat and parallel with respect to longitudinal axes of cooperating pairs of said track links and a second portion which is substantially flat and extends continuously at least from the lateral margins of the shoes to the sides of the links at the trailing end of said first portion with an inclination toward the beam portion of the links on the edge of the links opposite the track shoe supporting portion of said cooperating pairs of said track links, and a grouser projecting from a leading end of said first portion, wherein said leading end of said first portion of each track shoe is longitudinally spaced along said track links from a trailing end of said second portion of each preceding track shoe.

2. A track according to claim 1, wherein said uncovered ground stepping surface consists of a plate member which is bent along a line to define said first and second portions.

3. A track according to claim 2, wherein said second portion is composed of two plate portions arranged at both sides of said track shoe, and an unbent central plate portion being located between said two plate portions for the mounting of said track shoe on said track links.

4. A track according to claim 1, wherein said uncovered ground stepping surface consists of a box-shaped member having a bottom and inclined side outer surfaces defining said first and second portions, respectively.

5. A track according to claim 4, wherein recess means are provided at said bottom and inclined side outer surfaces for receiving bolt heads so as to mount said track shoe on said track links.

References Cited

UNITED STATES PATENTS

| | | | |
|---|---|---|---|
| 1,487,416 | 3/1924 | Whitlock | 305—58 |
| 1,705,802 | 3/1929 | Best. | |
| 3,336,088 | 8/1967 | Bauer | 305—54 |

FOREIGN PATENTS

| | | |
|---|---|---|
| 818,523 | 8/1959 | Great Britain. |
| 1,006,397 | 9/1965 | Great Britain. |

RICHARD J. JOHNSON, Primary Examiner